US008427549B2

(12) United States Patent
Oka

(10) Patent No.: US 8,427,549 B2
(45) Date of Patent: Apr. 23, 2013

(54) APPARATUS, METHOD, AND RECORDING MEDIUM FOR DISPLAYING A PIXEL HAVING A PREDETERMINED LUMINANCE IN AN OUTPUT IMAGE TO BE IDENTIFIABLE FROM A POSITION

(75) Inventor: Hiroto Oka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 301 days.

(21) Appl. No.: 12/754,542

(22) Filed: Apr. 5, 2010

(65) Prior Publication Data
US 2010/0259635 A1      Oct. 14, 2010

(30) Foreign Application Priority Data

Apr. 8, 2009   (JP) ................................. 2009-094028

(51) Int. Cl.
*H04N 5/228*       (2006.01)
(52) U.S. Cl.
USPC ....................................................... 348/222.1
(58) Field of Classification Search ............... 348/222.1, 348/247, 246, 223.1
See application file for complete search history.

(56) References Cited

U.S. PATENT DOCUMENTS

| | | | |
|---|---|---|---|
| 5,237,316 A * | 8/1993 | Cox et al. ........................ | 345/605 |
| 6,535,245 B1 * | 3/2003 | Yamamoto .................. | 348/223.1 |
| 7,129,980 B1 * | 10/2006 | Ashida ...................... | 348/333.04 |
| 7,130,474 B2 * | 10/2006 | Luo et al. ........................ | 382/239 |
| 7,308,119 B2 * | 12/2007 | Gohda et al. ................... | 382/118 |
| 8,059,174 B2 * | 11/2011 | Mann et al. .................... | 348/273 |
| 8,089,550 B2 * | 1/2012 | Ohyama .................. | 348/333.03 |
| 2002/0159648 A1 * | 10/2002 | Alderson et al. .............. | 382/260 |

FOREIGN PATENT DOCUMENTS

| JP | 2003-250067 A | 9/2003 |
|---|---|---|
| JP | 2004-297562 A | 10/2004 |
| JP | 2007-235421 A | 9/2007 |

* cited by examiner

*Primary Examiner* — Roberto Velez
*Assistant Examiner* — Gary C Vieaux
(74) *Attorney, Agent, or Firm* — Canon U.S.A., Inc. IP Division

(57) ABSTRACT

An apparatus according to the present invention includes an acquisition unit configured to acquire an input image, a conversion unit configured to convert the acquired input image to an output image, a detection unit configured to detect in the input image a pixel having a predetermined luminance, a calculation unit configured to calculate a position of an output image corresponding to a position of the detected pixel, and a display unit configured to display the output image on a screen.

14 Claims, 18 Drawing Sheets

RESULT OF NON-LINEAR IMAGE PROCESSING

# APPARATUS, METHOD, AND RECORDING MEDIUM FOR DISPLAYING A PIXEL HAVING A PREDETERMINED LUMINANCE IN AN OUTPUT IMAGE TO BE IDENTIFIABLE FROM A POSITION

BACKGROUND OF THE INVENTION

1. Field of the Invention

The present invention relates to an image display apparatus that converts an input image to a display image and displays the display image, an image display method, and a recording medium.

2. Description of the Related Art

There are imaging apparatuses such as a digital camera that develops (converts) raw data input from an image sensor such as a charge-coupling device (CCD) sensor or a complementary metal-oxide semiconductor (CMOS) sensor into Joint Photographic Experts Group (JPEG) data. The imaging apparatus then records the JPEG data on a recording medium. Further, there are imaging apparatuses that record raw data as is or as close to the original raw data as possible.

In the raw data, one pixel is often expressed by 12 bits or greater. On the other hand, in an image display apparatus such as a liquid crystal display (LCD) panel in the digital camera or a monitor of a personal computer (PC), one pixel is expressed by 8 bits. Therefore, if the raw image is developed and converted to the JPEG image, one pixel is reduced to 8 bits. An image in which one pixel is expressed by 12 bits is referred to as an "image in which a bit depth is 12 bits", and hereinafter will be referred to as a "12-bit image".

Further, Japanese Patent Application Laid-Open No. 2003-250067 discusses an imaging apparatus that converts light entering an optical system into image data, i.e., an electric signal. When displaying the image data on a display unit, the imaging apparatus notifies a user on a portion of the image data in which luminance is greater than or equal to an upper limit value (i.e., overexposed) or is less than or equal to a lower limit value (i.e., underexposed). In other words, the imaging apparatus notifies on a portion in which there is color saturation.

Conventionally, when there is saturation in the displayed JPEG image, which is converted from the raw image, there are cases where the original raw image is not saturated so that the colors are correctly expressed in the original raw image.

However, Japanese Patent Application Laid-Open No. 2003-250067 only discusses notifying on whether the 8-bit image to be displayed is saturated.

As a result, when the imaging apparatus or the image display apparatus displays an image of lower bit depth after conversion (e.g., an 8-bit image), the user cannot confirm whether the image of higher bit depth before conversion (e.g., a 12-bit image) is saturated.

SUMMARY OF THE INVENTION

According to an aspect of the present invention, an apparatus includes an acquisition unit configured to acquire an input image, a conversion unit configured to convert the acquired input image to an output image of lower bit depth, a detection unit configured to detect in the input image a pixel having a predetermined luminance, a calculation unit configured to calculate a position of the output image corresponding to a position of the detected pixel, and a display unit configured to display the output image on a screen.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
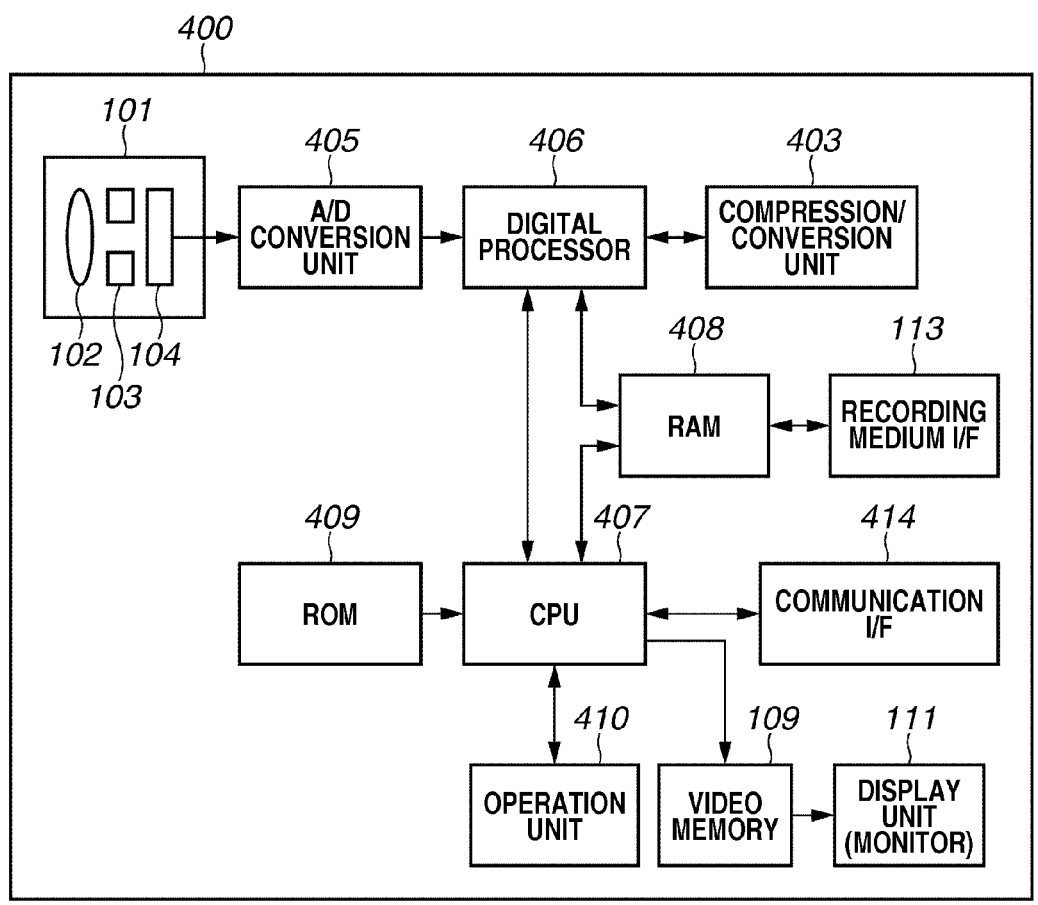
FIG. 1 is a block diagram illustrating an example of a configuration of an imaging apparatus according to an exemplary embodiment of the present invention.

FIG. 1 is a block diagram illustrating an example of a configuration of an imaging apparatus according to an exemplary embodiment of the present invention.

Referring to FIG. 1, an imaging apparatus 400 is, for example, a digital camera. An imaging optical system 101 having an image pickup function mainly includes a lens 102, a shutter 103, and an image sensor 104. An analog/digital (A/D) conversion unit 405 converts an analog signal output from the imaging optical system 101 to a digital signal. A digital processor 406 is an image processing unit, which performs various image processing in cooperation with a central processing unit (CPU) 407 and a random access memory (RAM) 408.

A compression/conversion unit 403 compresses the raw image output from the digital processor 406 or converts the raw image to the JPEG image. A read-only memory (ROM) 409 records programs to be used by the digital processor 406 to perform image processing control or the CPU 407 to perform control of the entire imaging apparatus 400.

Such programs are copied from the ROM 409 onto the RAM 408 and executed by the CPU 407 when the imaging apparatus 400 is activated. An operation unit 410, which is used by the user to operate the imaging apparatus 400, includes switches, buttons, and dials.

A recording medium interface (I/F) 113 connects the imaging apparatus 400 to a recording medium (not illustrated) such as a memory card. The image data recorded in the RAM 408 are recorded on the recording medium via the recording medium I/F 113. A video memory 109 temporarily records 8-bit image data to be displayed on a display unit (monitor) 111. A communication I/F 414 such as a universal serial bus (USB) port connects the imaging apparatus 400 with external devices to perform data communication. The above-described components transmit and receive data between each other via a bus (not illustrated).

Since an image of higher bit depth such as the raw data cannot be directly displayed on the monitor, the image to an image of lower bit depth is to be converted. A function for converting an image whose bit depth is higher than or equal to 12 bits (e.g., raw data, hereinafter referred to as 12-bit data) into an image whose bit depth is lower than 12 bit (hereinafter referred to as 8-bit data) and displaying the converted image will be described below.

Figure 2:
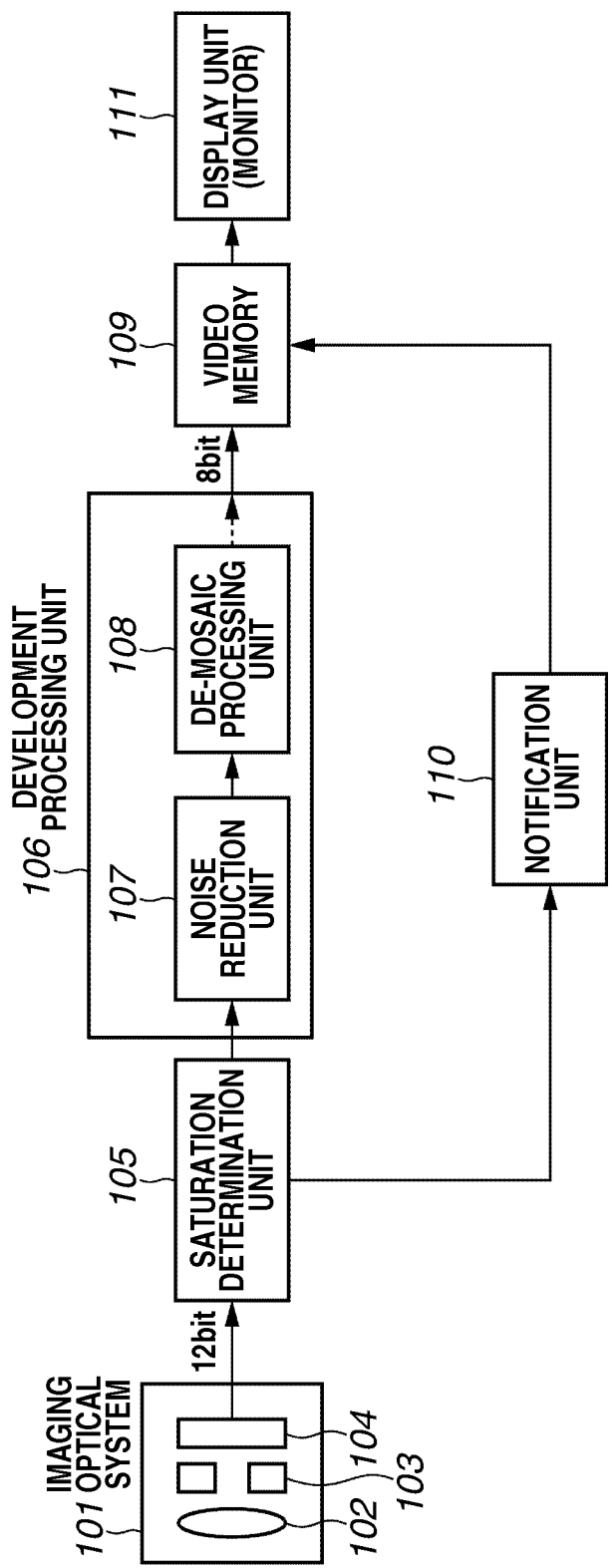
FIG. 2 is a block diagram illustrating an example of a configuration of an image conversion-display function in an imaging apparatus according to an exemplary embodiment of the present invention.

FIG. 2 is a block diagram illustrating a configuration of the image conversion-display function in the imaging apparatus illustrated in FIG. 1.

Figure 12:
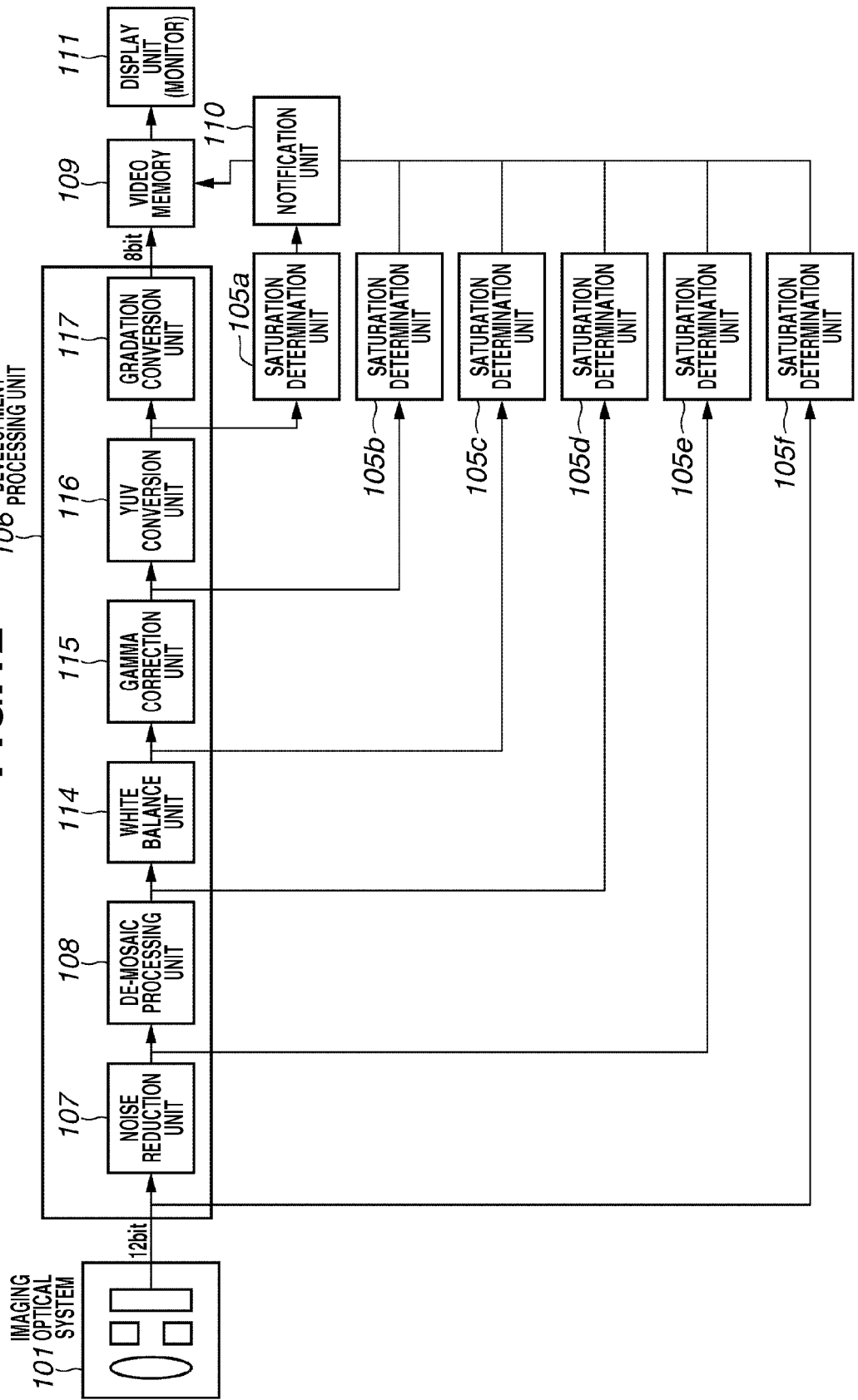
FIG. 12 is a block diagram illustrating an example of a configuration of an image conversion-display function in an imaging apparatus according to a third exemplary embodiment of the present invention.

Referring to FIG. 2, the image data picked up by the imaging optical system. 101 is input to a development processing unit 106 via a saturation determination unit 105. The development processing unit 106 includes a plurality of image processing units such as a noise reduction unit 107 and a de-mosaic processing unit 108. The developing processing unit 106 also includes a white balance unit 114, a gamma correction unit 115, a YUV conversion unit 116, and a gradation conversion unit 117 that are not illustrated in FIG. 2 and are illustrated in FIG. 12.

The development processing unit 106 converts the input image to an image that can be displayed on the monitor 111 (e.g., from a 12-bit image to an 8-bit image) and recorded in the video memory 109.

The saturation determination unit 105 determines whether there is a saturated pixel in the 12-bit image input from the imaging optical system 101. More specifically, the saturation determination unit 105 determines that a pixel is saturated if a relation between luminance l of a pixel in the 12-bit image and predetermined threshold values M and N (wherein M<N) is such that l<M or l>N.

If the saturation determination unit 105 determines that there is a saturated pixel in the 12-bit image, the saturation determination unit 105 notifies a notification unit 110 thereof. The notification unit 110 then writes on the 8-bit image data recorded in the video memory 109 information indicating that there is a saturated pixel in the 12-bit image. A method for writing such information and the content thereof will be described below. The video memory 109 then outputs the 8-bit image data in which the information is written to the monitor 111.

The above-described saturation determination unit 105, the development processing unit 106, and the notification unit 110 are configured of the A/D conversion unit 405, the digital processor 406, the compression/conversion unit 403, the CPU 407, and the RAM 408 illustrated in FIG. 1.

A difference between saturation in the 12-bit image and in the 8-bit image will be described below with reference to FIG. 3 and FIG. 4.

Figure 3:
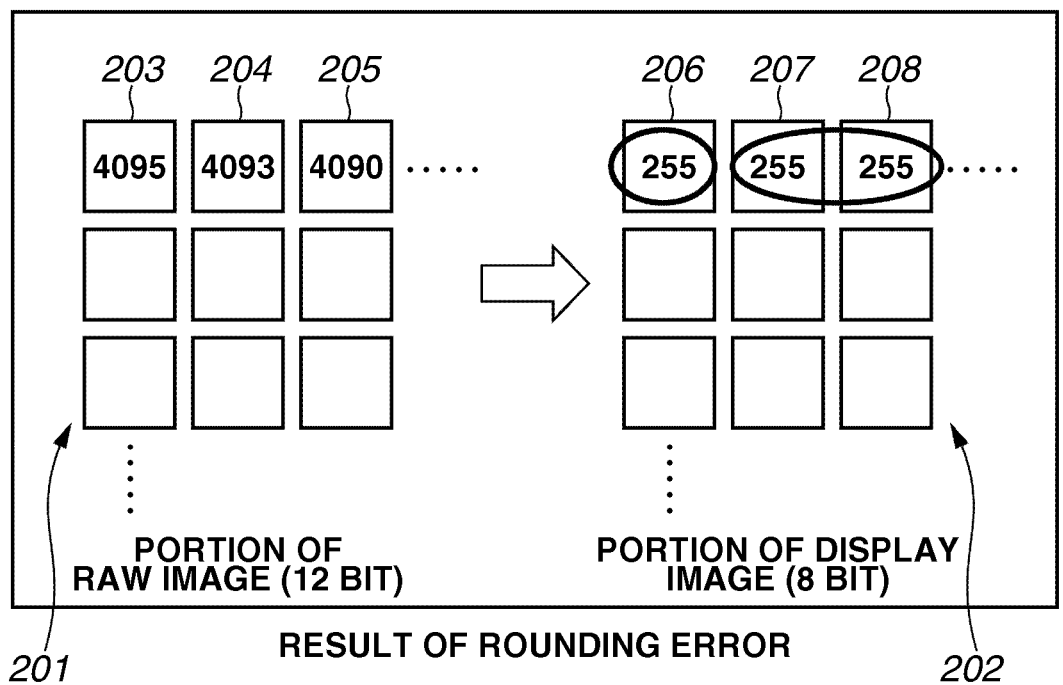
FIG. 3 illustrates luminance of pixels in a 12-bit image and an 8-bit image according to an exemplary embodiment of the present invention.

FIG. 3 illustrates an example in which saturation is generated in the 8-bit image due to a rounding error.

Referring to FIG. 3, an 8-bit (display) image 202 is created by converting a 12-bit (raw) image 201. The 12-bit image 201 includes pixels 203, 204, and 205, and the 8-bit image 202 includes pixels 206, 207, and 208. A number written in each pixel indicates a pixel value.

The pixel value of the pixel 203 in the 12-bit image 201 is "4095", which is the maximum value for the 12-bit image data. In other words, the actual pixel value of the pixel 203 may be greater than 4095. Therefore, the pixel 203 is determined to be saturated.

On the other hand, the pixel values of the pixels 204 and 205 are less than "4095" and are thus determined to store the correct values, i.e., determined to be not saturated. The pixels 203, 204, and 205 have different pixel values and thus store gradations.

The pixel values of pixels 206, 207, and 208 in the 8-bit image 202 which correspond to the pixels 203, 204, and 205 are all 255 by being rounded off. Since the 8-bit image has only one-sixteenth of gradations as compared to the 12-bit image, 16 gradations in the 12-bit image is expressed as 1 gradation in the 8-bit image. The pixel values of the pixels 206, 207, and 208 are "255', which is the maximum value that can be expressed in 8 bit. The pixels 206, 207, and 208 are thus determined to be saturated.

Figure 4:
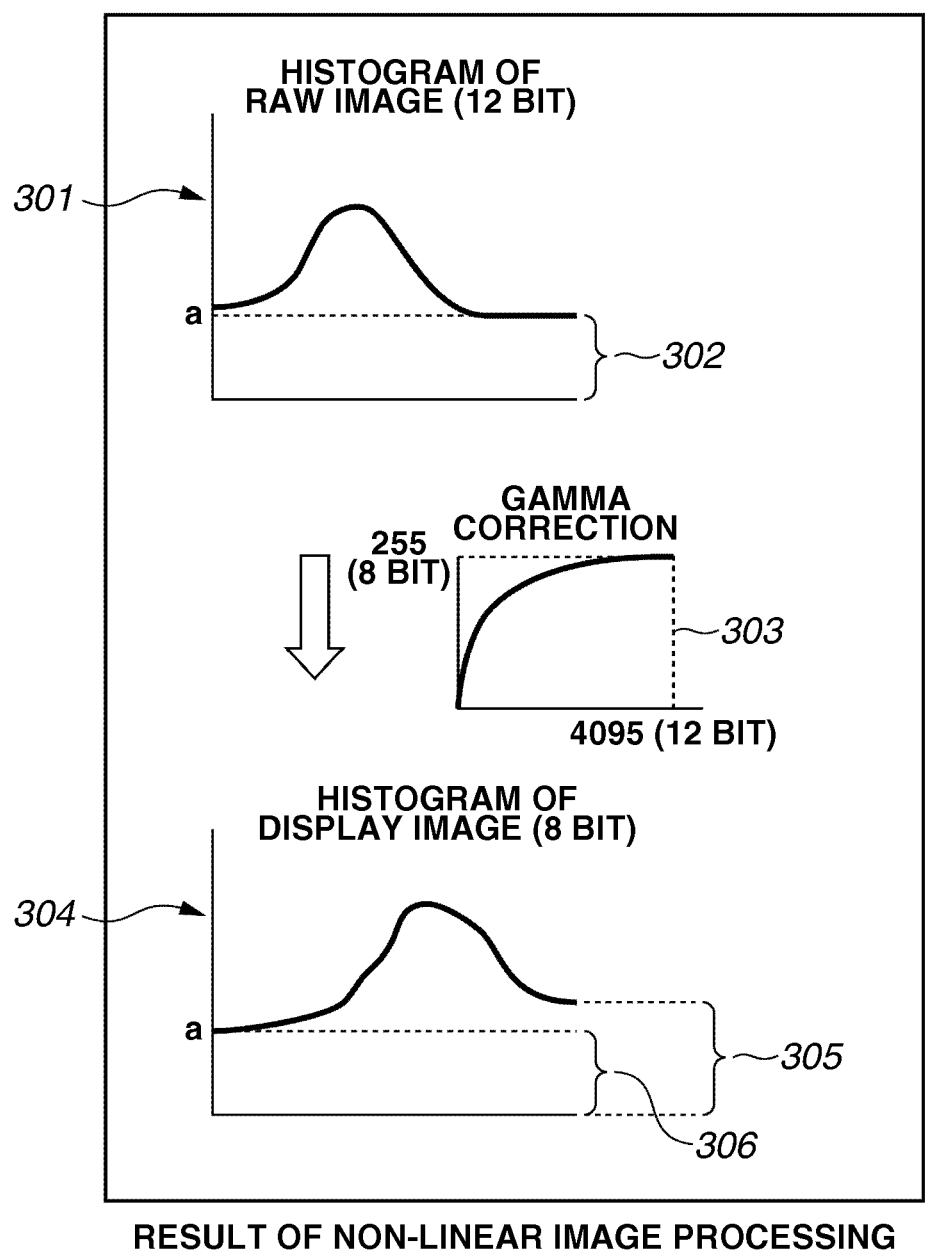
FIG. 4 illustrates a process of converting a 12-bit image to an 8-bit image by performing non-linear image processing according to an exemplary embodiment of the present invention.

FIG. 4 illustrates an example in which saturation is generated in the 8-bit image by non-linear image processing. A gamma correction is described as an example of the non-linear image processing.

Referring to FIG. 4, a histogram 301 is a histogram of the 12-bit image, and a number of pixels whose luminance is the maximum value therein 302 indicates a number of saturated pixels. Gamma correction 303 is then performed to convert the 12-bit image to an 8-bit image, and a histogram 304 is the acquired result.

The gamma correction 303 converts comparatively low luminance to high luminance, so that the peak in the histogram shifts to the right, and pixels that were not saturated in the 12-bit image are saturated in the 8-bit image. As a result, in the example illustrated in FIG. 4, a number of saturated pixels in the 8-bit image 305 is greater than a number of saturated pixels in the 12-bit image 306.

A shooting process in the imaging apparatus 400 will be described below with reference to flowcharts illustrated in FIG. 5, FIG. 6, and FIG. 7.

Figure 5:
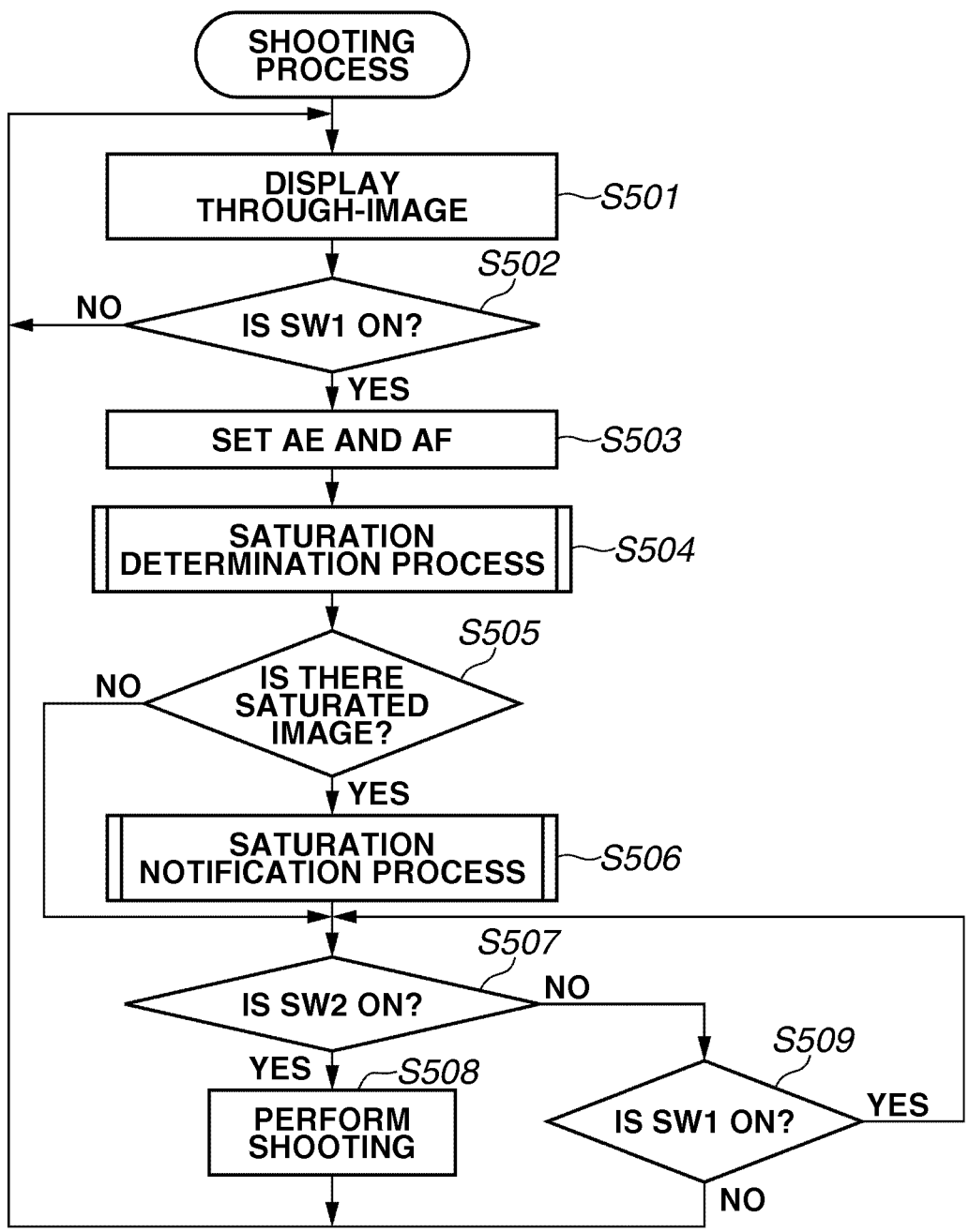
FIG. 5 is a flowchart illustrating a shooting process performed in an imaging apparatus according to an exemplary embodiment of the present invention.

FIG. 5 is a flowchart illustrating a shooting process performed in the imaging apparatus 400. The process is realized by the CPU 407 mainly performing control by executing a control program read out from the ROM 409 to the RAM 408.

In step S501, upon the imaging apparatus 400 entering a shooting mode, the CPU 407 directly displays an input image picked up by the imaging optical system 101 on the monitor 111 as a through image. Since the process is performed by a known method, description will be omitted.

In step S502, the CPU 407 determines whether a shutter button SW1 is half pressed (i.e., switched on). If the CPU 407 determines that the shutter button SW1 is not half pressed (NO in step S502), the process returns to step S501. If the shutter button SW1 is half pressed (YES in step S502), the process proceeds to step S503. In step S503, the CPU 407 sets an automatic exposure (AE) or an auto-focus (AF) function. Since methods for setting the AE and the AF functions are known methods, description will be omitted.

In step S504, the CPU 407 performs a saturation determination process for determining whether the input image is saturated, and the process then proceeds to step S505. The saturation determination process will be described in detail below with reference to FIG. 6.

In step S505, the CPU 407 determines whether saturation is generated in the image. If saturation is generated in the image (YES in step S505), the process proceeds to step S506. In step S506, the CPU 407 performs a saturation notification process for notifying the user on saturation, and the process then proceeds to step S507. The saturation notification process will be described in detail below with reference to FIG. 7.

On the other hand, if the CPU 407 determines that saturation is not generated in the image (NO in step S505), the process proceeds to step S507. In step S507, the CPU 407 determines whether a shutter button SW2 is full pressed (i.e., switched on). If the shutter button SW2 is full pressed (YES in step S507), the process proceeds to step S508. In step S508, the CPU 407 performs shooting, and the process then returns to step S501.

If the shutter button SW2 is not full pressed (NO in step S507), the process proceeds to step S509. In step S509, the CPU 407 determines whether the shutter button SW1 is half pressed (i.e., switched on). If the shutter button SW1 is half pressed (YES in step S509), the process returns to step S507. On the other hand, if the shutter button SW1 is not half pressed (NO in step S509), the process returns to step S501.

Figure 6:
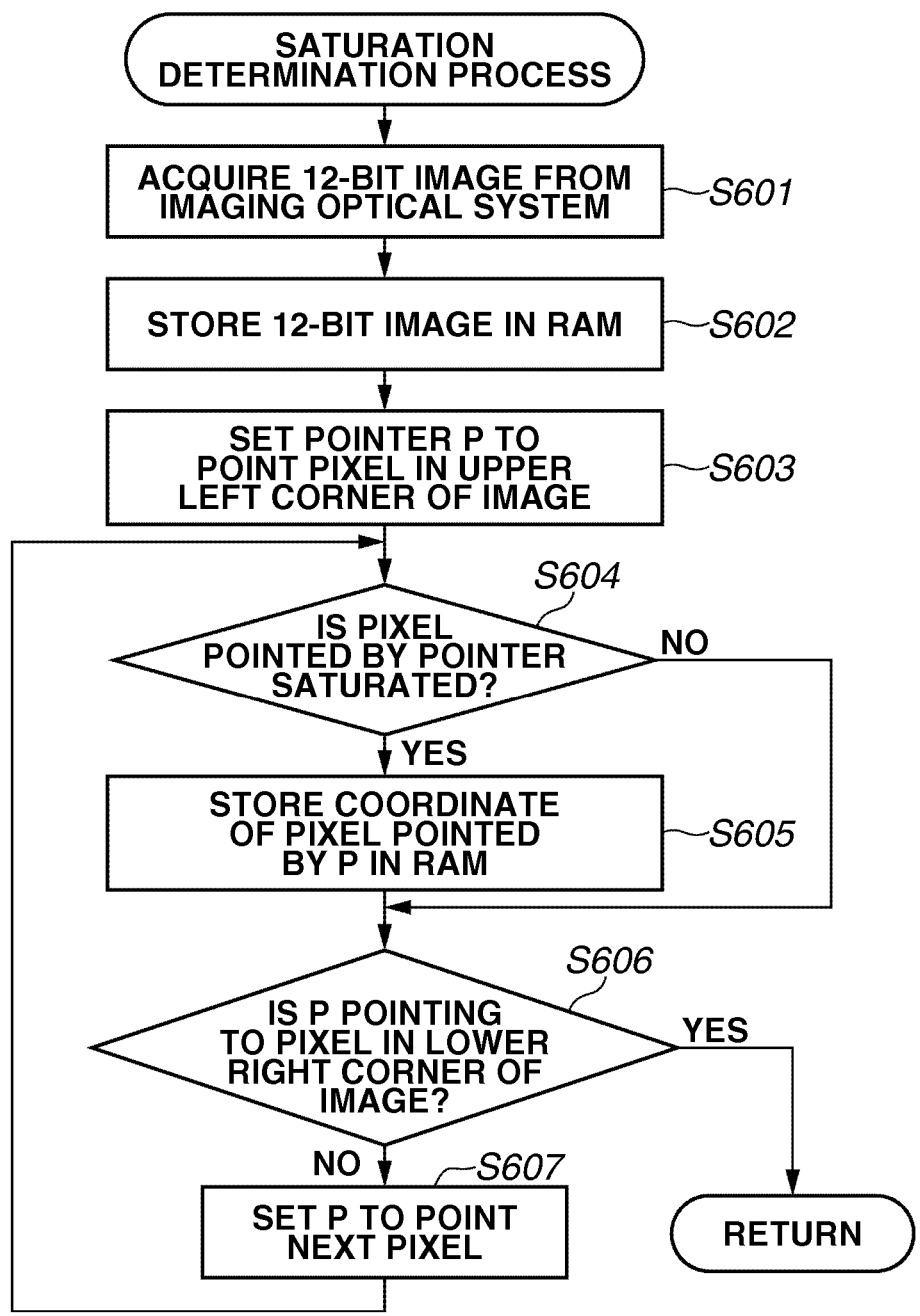
FIG. 6 is a flowchart illustrating a saturation determination process performed in an imaging apparatus according to an exemplary embodiment of the present invention.

FIG. 6 is a flowchart illustrating in detail the saturation determination process performed in step S504 illustrated in FIG. 5. The process illustrated in FIG. 6 is performed by a function of the saturation determination unit 105 illustrated in FIG. 2. However, the process is actually performed by the CPU 407 in cooperation with the digital processor 406.

In step S601, the saturation determination unit 105 acquires the 12-bit input image from the imaging optical system 101. In step S602, the saturation determination unit 105 records the acquired input image in the RAM 408. More specifically, the saturation determination unit 105 compares the bit depth of the input image transmitted from the imaging optical system 101 with a threshold value (i.e., 12 bit according to the present exemplary embodiment). If the bit depth of the input image is higher than or equal to the threshold value, the saturation determination unit 105 acquires the input image in step S601 as a target for performing the saturation determination process.

In step S603, the saturation determination unit 105 sets a pointer P, which is used to point to a pixel, to a pixel in the upper-left corner (coordinate (0, 0)) of the input image recorded in the RAM 408.

In step S604, the saturation determination unit 105 determines whether the pixel that the pointer P points to is saturated. In other words, if a relation between a pixel value l of the pixel pointed to by the pointer P and threshold values M and N (constants) is l<M or l>N, the pixel is determined to be saturated. For example, if M=5 and N=4090, saturation is determined by a condition l<5 or l>4090.

If the saturation determination unit 105 determines that the pixel pointed to by the pointer P is saturated (YES in step S604), the process proceeds to step S605. In step S605, the saturation determination unit 105 records the coordinate of the pixel pointed to by the pointer in the RAM 408, and the process then proceeds to step S606. On the other hand, if the saturation determination unit 105 determines that the pixel pointed to by the pointer P is not saturated (NO in step S604), the process proceeds to step S606.

In step S606, the saturation determination unit 105 determines whether the pointer P points to a pixel in a lower-right corner of the input image. If the pointer P is pointing to the pixel in the lower-right corner (YES in step S606), the saturation determination unit 105 determines that the saturation determination is completed for all pixels in the input image. The process then ends.

If the pointer P is not pointing to the pixel in the lower-right corner (NO in step S606), the process proceeds to step S607. In step S607, the saturation determination unit 105 sets the pointer P to point to the next pixel, and the process returns to step S604. More specifically, if the pixel pointed to by the pointer P is not a pixel at the right end of the input image, the saturation determination unit 105 causes the pointer P to point to the next pixel on the right side of the pixel that the pointer P has been pointing to. Further, if the pointer P is pointing to the pixel at the right end, the saturation determination unit 105 causes the pointer P to point to a pixel on the left end of a line below the pixel that the pointer P has been pointing to.

Figure 7:
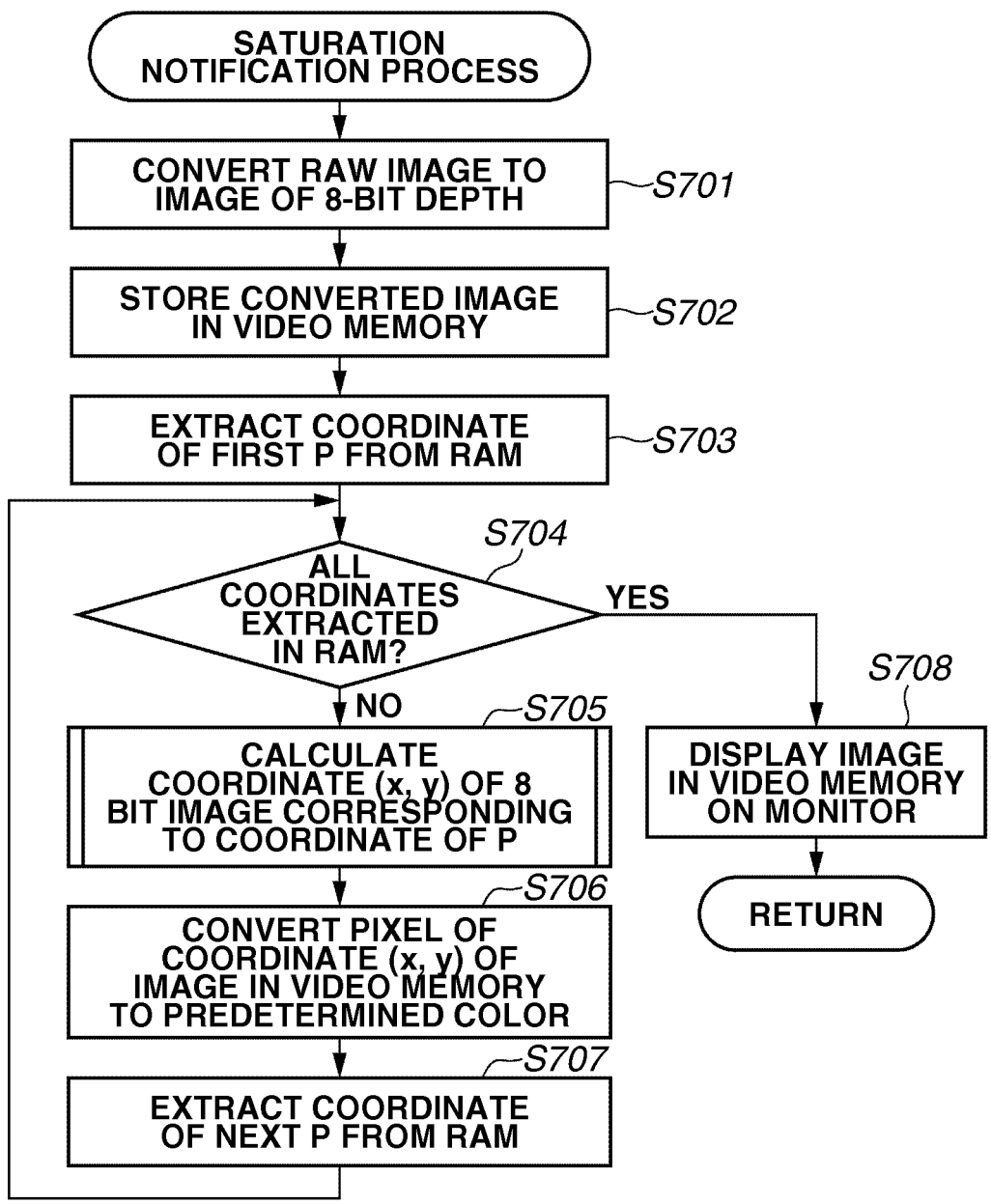
FIG. 7 is a flowchart illustrating a saturation notification process performed in an imaging apparatus according to an exemplary embodiment of the present invention.

FIG. 7 is a flowchart illustrating in detail the saturation notification process performed in step S506 illustrated in FIG. 5. The process is performed by the development processing unit 106 and the notification unit 110 illustrated in FIG. 2. However, the process is actually performed by the CPU 407 in cooperation with the digital processor 406.

In step S701, the development processing unit 106 converts the 12-bit input image (raw image) to the 8-bit image. Since the conversion method is a known method, description will be omitted.

In step S702, the development processing unit 106 records the converted 8-bit image on the video memory 109. In step S703, the notification unit 110 extracts a first coordinate P from coordinates of the pixels recorded on the RAM 408 in step S605. In step S704, the notification unit 110 determines whether all coordinates in the RAM 408 are extracted.

If there is a coordinate that has not been extracted (NO in step S704), the process proceeds to step S705. In step S705, the notification unit 110 acquires the coordinate of the pixel on the 8-bit image at a position corresponding to the coordinate P. More specifically, if the width and the height of the 12 bit input image are M and N respectively, and the width and the height of the 8-bit image are m and n respectively, a coordinate (x, y) on the 8-bit image corresponding to a coordinate (X, Y) of P can be acquired by the following equations.

$$x = X * (m/M)$$

$$y = Y * (n/N)$$

In step S706, the notification unit 110 converts a color of the pixel at a position corresponding to the coordinate (x, y) on the 8-bit image in the video memory 109 to a predetermined color (such as red). In step S707, the notification unit 110 extracts the next coordinate P from the RAM 408. The process then returns to step S704.

In step S704, if the notification unit 110 determines that all coordinates in the RAM 408 have been extracted (YES in step S704), the process proceeds to step S708. In step S708, the notification unit 110 displays on the monitor 111 the image recorded in the video memory 109.

Figure 8:
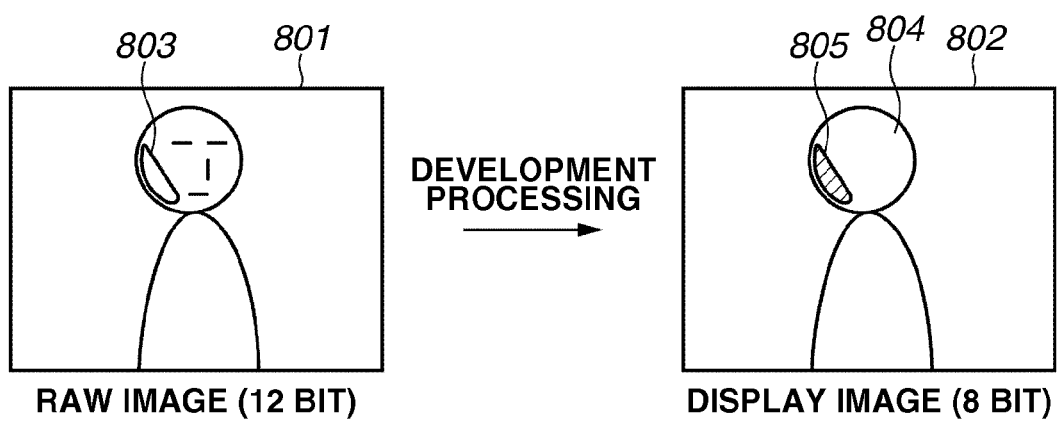
FIG. 8 illustrates an image display method in an imaging apparatus according to an exemplary embodiment of the present invention.

FIG. 8 illustrates the image display method in the imaging apparatus 400.

Referring to FIG. 8, a raw image 801 is the 12-bit image input from the imaging optical system 101, and a display image 802 is the 8-bit image acquired as a result of developing the raw image. A portion 803 of a face of a person is saturated in the raw image 801.

On the other hand, all of a facial portion 804 of a person is saturated as described above with reference to FIG. 3 and FIG. 4. The user cannot determine from only the display image 802 whether saturation is generated in the raw image 801 or the saturated portion.

Therefore, according to the present exemplary embodiment, a portion 805 in the display image 802 that corresponds to the saturated portion 803 in the raw image 801 becomes colored (e.g., using a red color). As a result, the user can easily recognize the saturated portion in the raw image 801.

There are two types of saturation, i.e., cases where the luminance of the image is greater than a threshold value and where the luminance of the image is less than a threshold value. For example, the user can be notified of saturation by using the red color when the luminance is greater than the threshold value and the blue color when the luminance is less than the threshold value. The user can then easily recognize shooting conditions (such as exposure) for preventing saturation.

Further, according to the present exemplary embodiment, the red color is used in the saturated portion in the input image to notify the user of the saturation in the raw image. However, the saturation can be notified by methods such as encircling the saturated portion by a line or by blinking. After converting a first image to a second image, which is different from the first image in bit depth, and obtaining information about a pixel having a predetermined luminance, the information may be output when the second image is displayed. The information may include one of the presence, the position, and the ratio regarding the pixel having the predetermined luminance. The outputting method may include displaying the information or notifying (e.g., by vibration) a user of the presence of the pixel.

The above-described processes illustrated in FIGS. 5, 6, and 7 allows the user of the imaging apparatus 400 to recognize whether saturation will be generated and which portion will be saturated by half pressing the shutter button. The user can then reduce the saturated portion by adjusting exposure and sensitivity or using a flash.

Figure 9A:
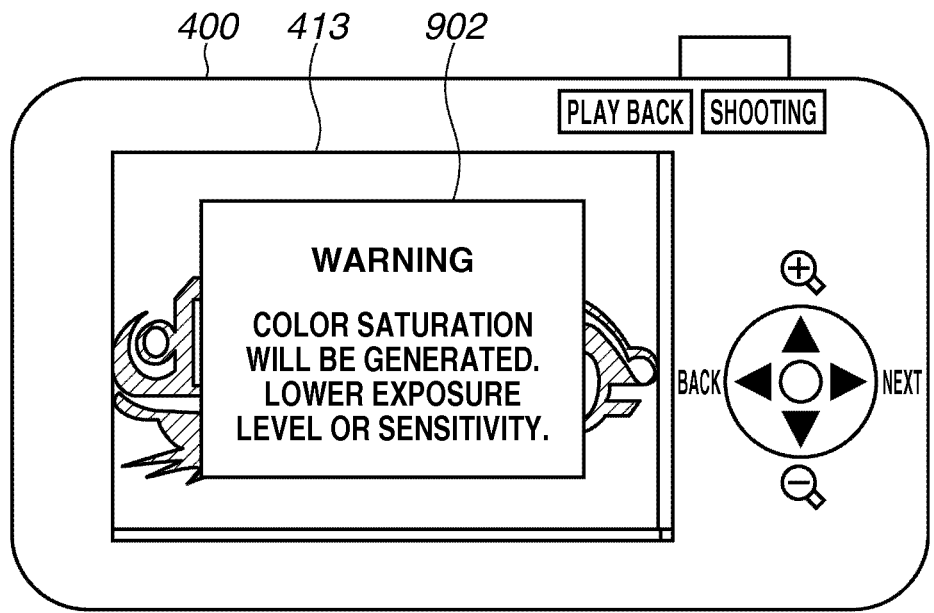
FIGS. 9A and 9B illustrate examples of displaying a message screen according to an exemplary embodiment of the present invention.

Further, if saturation is generated, the imaging apparatus 400 may also guide the user on how to reduce saturation by displaying a message screen 902 illustrated in FIG. 9A. Furthermore, the imaging apparatus 400 may be configured to automatically adjust exposure, sensitivity, and adjustment parameters such as white balance, so that the luminance of the pixels in the saturated portion falls within a preset range.

In the above-described exemplary embodiment, the saturated portion is superimposed on the display image and displayed to notify the user on saturation in the input image. However, other methods can be used. For example, an icon can be displayed in a corner of the monitor. Further, a light-emitting diode (LED) can be flashed or a warning can be beeped instead of using the monitor.

Further, according to the above-described exemplary embodiment, determination on whether there is a saturated pixel in the-12 bit input image is performed as illustrated in FIG. 5. However, the determination can also be performed on the 8-bit output image acquired by developing the input image.

In such a case, the threshold value (N) of the luminance for determining saturation due to overexposure is low in the 8-bit output image as compared to the 12-bit image. On the contrary, the threshold value (M) of the luminance for determining saturation due to underexposure is high in the 8-bit output image as compared to the 12-bit image. The saturated portions in the 12-bit image and the 8-bit image can be replaced by different colors and notified to be distinguishable for the user.

Figure 9B:
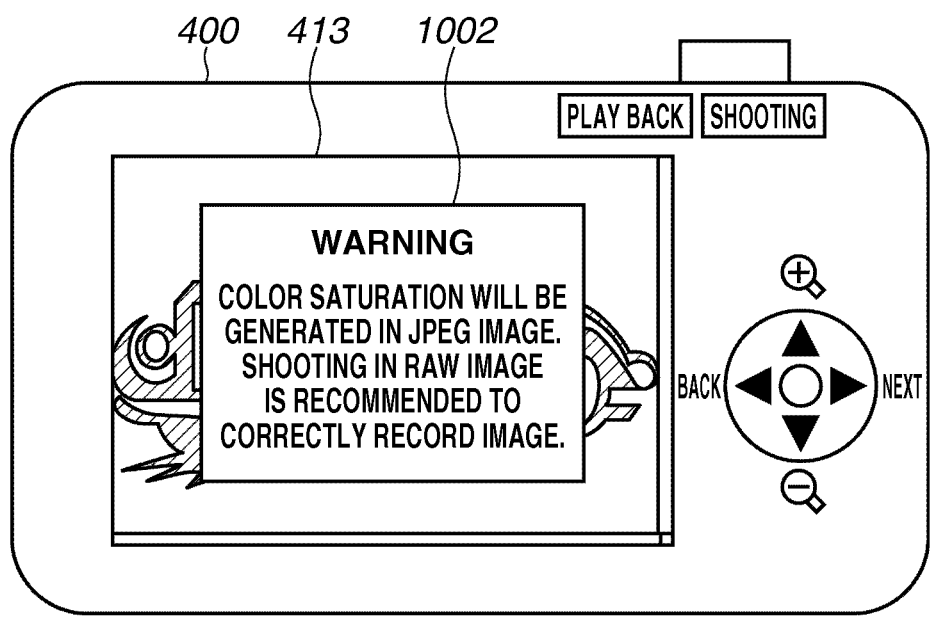

Furthermore, the 12-bit image (e.g., raw image) can express more detailed gradation as compared to the 8-bit image. Therefore, if the imaging apparatus 400 can record the 12-bit image on the recording medium via the recording medium I/F 113, such function can be used. More specifically, when the imaging apparatus 400 is in a mode for recording only the JPEG 8-bit image and the 8-bit image is determined to be saturated, the imaging apparatus 400 may display a message screen 1002 illustrated in FIG. 9B and urge the user to change the mode to a mode for recording the 12-bit image.

Generally, if saturation is detected in the 12-bit image, there is saturation of a wider range in the 8-bit image that is created by converting such 12-bit image. It is thus effective to record the 12-bit image in the shooting mode and then create the 8-bit image by developing the 12-bit image using appropriate developing parameters.

Further, if the 8-bit image is saturated when the imaging apparatus 400 is in a mode for recording only the 8-bit image, the imaging apparatus 400 can display a message screen (not illustrated) to urge the user to change the mode to the mode for recording the 12-bit image.

Furthermore, if the 8-bit image is saturated and the 12-bit image is not saturated when the imaging apparatus 400 is in the mode for recording only the 8-bit image, the imaging apparatus 400 can display a message screen (not illustrated). The imaging apparatus may thus urge the user to change the mode to the mode for recording the 12-bit image.

According to the first exemplary embodiment, when the imaging apparatus is to display a converted image of lower bit depth, the image of higher bit depth before conversion and the position of the saturated portion can be distinguishably displayed. As a result, the user can easily recognize the image, which is saturated and is thus not appropriate for viewing or processing.

A second exemplary embodiment according to the present invention will be described below. The imaging apparatus according to the second exemplary embodiment is proximately the same as the imaging apparatus according to the first exemplary embodiment except for the portions corresponding to those illustrated in FIG. 2 and FIG. 7. The same reference numbers will be used in portions similar to those in the first exemplary embodiment, and further description will be omitted. The difference from the first exemplary embodiment will be described below.

A certain amount of time is used for converting an image of higher bit depth such as raw data to an image of lower bit depth such as JPEG data. There is thus an imaging apparatus including a function for embedding the converted JPE data or thumbnail image data in the raw data.

The second exemplary embodiment is directed to an imaging apparatus capable of writing, using the above-described function, information about the saturated portion of the raw data in the JPEG data or the thumbnail image data embedded in the RAW data or a header.

Figure 10:
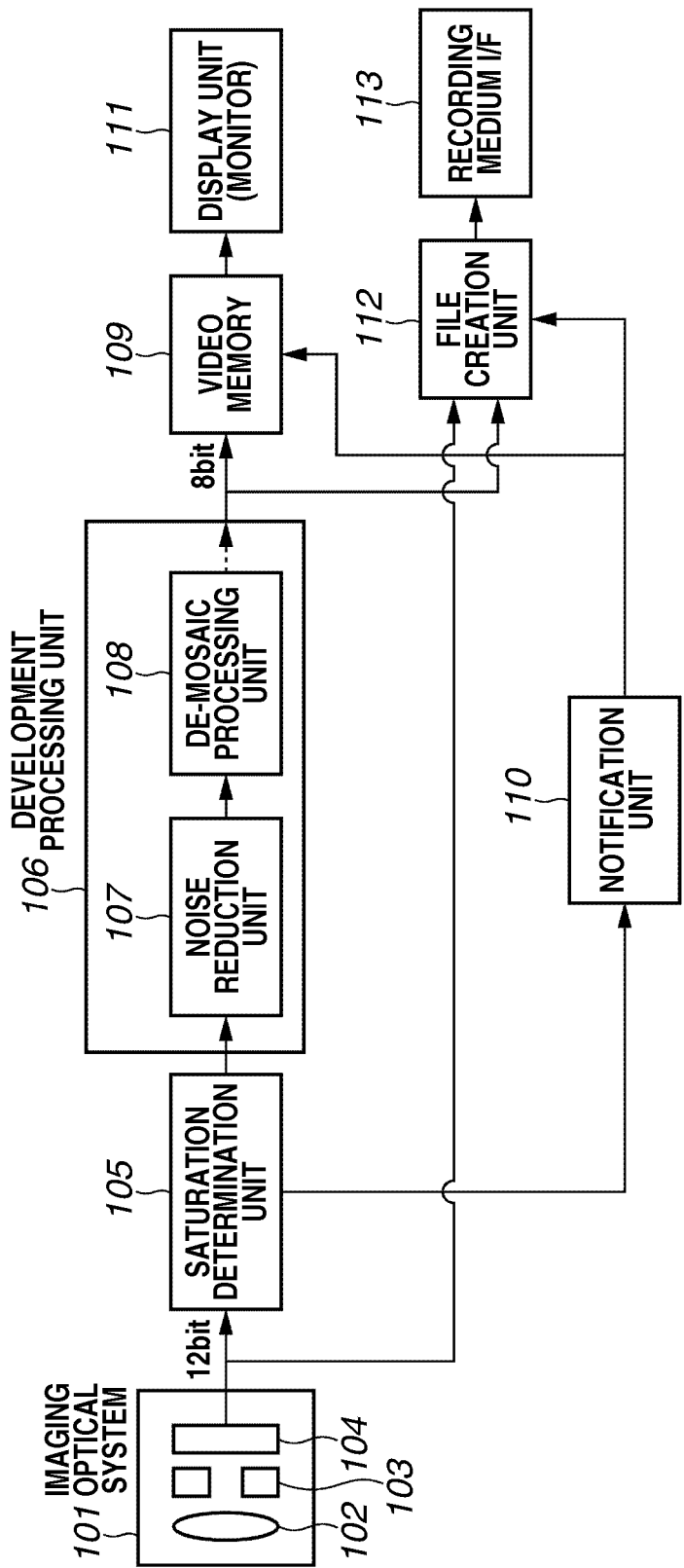
FIG. 10 is a block diagram illustrating an example of a configuration of an image conversion-display function in an imaging apparatus according to a second exemplary embodiment of the present invention.

FIG. 10 is a block diagram illustrating a configuration of the image conversion-display function of the imaging apparatus according to the second exemplary embodiment of the present invention.

Referring to FIG. 10, the image data of the image picked up by the imaging optical system 101 is transmitted to the development processing unit 106 via the saturation determination unit 105. The development processing unit 106 includes the noise reduction unit 107 and the de-mosaic processing unit 108. The development processing unit 106 converts the input image to an image, which can be displayed on the monitor 111 (e.g., from a 12-bit image to an 8-bit image), and records the converted image on the video memory 109.

The saturation determination unit 105 determines whether there is a saturated pixel in the 12-bit image input from the imaging optical system. 101. The determination method is the same as in the first exemplary embodiment, and description will thus be omitted. If the saturation determination unit 105 determines that there is a saturated pixel in the 12-bit image, the saturation determination unit 105 informs the notification unit 110 thereof.

The notification unit 110 then writes in the 8-bit image data recorded on the video memory 109 information indicating that there is a saturated pixel in the 12-bit image. The method for writing the information and the content thereof will be described below. The 8-bit image data in which the information is written is then output from the video memory 109 to the monitor 111.

The 12-bit image acquired from the imaging optical system 101 and the 8-bit image acquired from the development processing unit 106 are transmitted to a file creation unit 112, which is actually configured of the CPU 407 and the RAM 408. The file creation unit 112 converts the 8-bit image to an 8-bit JPEG image and a thumbnail image, embeds the JPEG image and the thumbnail image in the 12-bit image, and creates a file by adding appropriate header information.

If the saturation determination unit 105 determines that there is a saturated pixel in the 12-bit image, the notification unit 110 rewrites the file created by the file creation unit 112, so that the user can easily recognize that the 12-bit image is saturated. The process will be described below.

The file created by the file creation unit 112 is then output to a recording medium (not illustrated) via the recording medium I/F 113.

The saturation determination process performed by the imaging apparatus according to the present exemplary embodiment will be described below.

Figure 11:
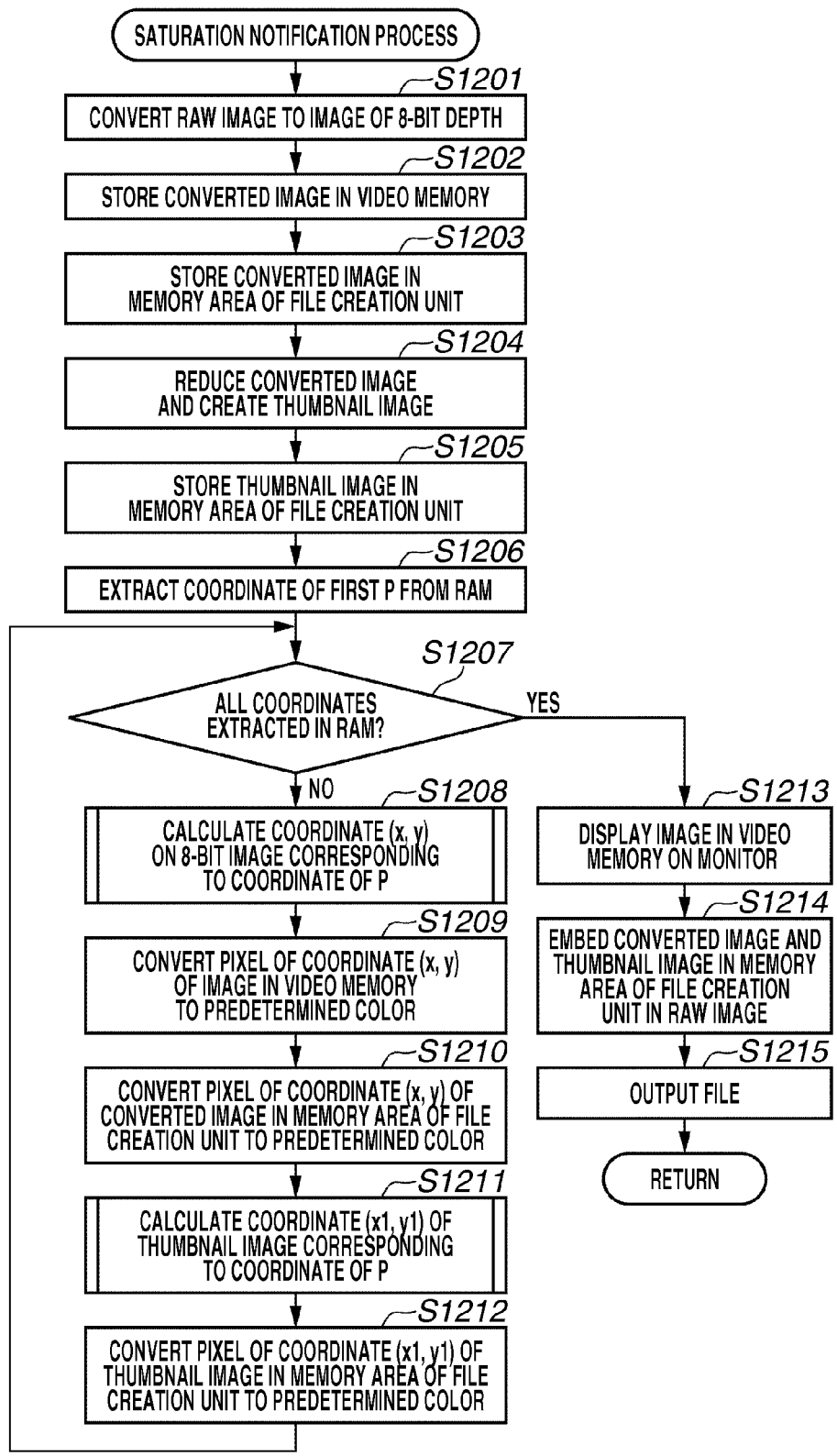
FIG. 11 is a flowchart illustrating a saturation notification process performed in an imaging apparatus according to the second exemplary embodiment of the present invention.

FIG. 11 is a flowchart illustrating the saturation determination process according to the second exemplary embodiment. The process is executed in step S506 illustrated in FIG. 5, and since the other processes illustrated in FIG. 5 are the same as in the first exemplary embodiment, description will be omitted. Further, the process is executed by the development processing unit 106, the notification unit 110, and the file creation unit 112 illustrated in FIG. 10. However, the process is actually performed by the CPU 407 in cooperation with the digital processor 406.

In step S1201, the development processing unit 106 converts the 12-bit input image to the 8-bit image. The conversion process is performed using a known method, and description will be omitted.

In step S1202, the development processing unit 106 records the converted 8-bit image in the video memory 109. In step S1203, the development processing unit 106 stores the converted 8-bit image in a memory area that the file creation unit 112 has acquired in the RAM 408. In step S1204, the development processing unit 106 reduces the converted 8-bit image and creates the thumbnail image. In step S1205, the development processing unit 106 stores the thumbnail image in the memory area that the file creation unit 112 has acquired in the RAM 408.

In step S1206, the notification unit 110 extracts a first coordinate P from the coordinates of the pixels recorded on the RAM 408 in step S605 illustrated in FIG. 6. In step S1207, the notification unit 110 determines whether all coordinates in the RAM 408 have been extracted.

If there is a coordinate that has not been extracted (NO in step S1207), the process proceeds to step S1208. In step S1208, the notification unit 110 acquires a coordinate (x, y) on the 8-bit image of the pixel in a position corresponding to a coordinate (X, Y) of the first coordinate P. Since the method for acquiring the coordinate is the same as the process performed in step S705 illustrated in FIG. 7, description will be omitted.

In step S1209, the notification unit 110 converts the color of the pixel of the coordinate (x, y) on the 8-bit image in the video memory 109 to a preset color (e.g., red). In step S1210, the notification unit 110 converts the color of the pixel indicated by the coordinate (x, y) on the 8-bit image in the memory area to the preset color (e.g., red).

In step S1211, the notification unit 110 acquires a coordinate (x1, y1) on the thumbnail image of a pixel in a position corresponding to the coordinate (X, Y) of P. Since the method for acquiring the coordinate is the same as in step S1208, description will be omitted.

In step S1212, the notification unit 110 converts the color of the pixel indicated by the coordinate (x1, y1) on the thumbnail image to the preset color (e.g., red). The process then returns to step S1207.

On the other hand, if the notification unit 110 determines in step S1207 that all coordinates in the RAM 408 have been extracted (YES in step S1207), the process proceeds to step S1213. In step S1213, the notification unit 110 displays the image recorded on the video memory 109 on the monitor 111. In step S1214, the file creation unit 112 creates an output file by embedding in the 12-bit image (raw image) the converted 8-bit image and the converted thumbnail image stored in the memory area. In step S1215, the file creation unit 112 outputs the output file to a recording medium (not illustrated) via the recording medium I/F 113.

According to the above-described exemplary embodiment, the saturated portion is superimposed on the JPEG image and the thumbnail image, which are embedded in the raw data (12-bit image), to notify the user of the saturation in the input image. However, other methods may be used. For example, when outputting the file, a saturated position (coordinate) on the 8-bit image corresponding to the position of the coordinate recorded on the RAM 408 in the saturation determination process may be recorded in the header portion of the raw data. The saturated position (coordinate) on the 8-bit image corresponding to the saturated position of the 12-bit image calculated in the saturation determination process may also be recorded in the header portion of the raw data. In such a case, the user may be notified of saturation when the image is reproduced. Further, whether there is saturation may be recorded in the header portion of the raw data, and may be notified to the user when the image is reproduced.

Furthermore, according to the above-described exemplary embodiment, the 8-bit image and the thumbnail image are embedded in the 12-bit input image. However, one of the 8-bit image and the thumbnail image can be embedded in the 12 bit input image.

According to the second exemplary embodiment, less time is used to distinguishably display whether there is saturation in the higher bit depth image before conversion by using the lower bit depth image after conversion.

A third exemplary embodiment according to the present invention will be described below. The imaging apparatus according to the third exemplary embodiment is almost the same as the imaging apparatus according to the first exemplary embodiment except for the portions corresponding to those illustrated in FIG. 2. The same reference numbers will thus be denoted to portions similar to those in the first exemplary embodiment, and further description will be omitted. Further, the imaging apparatus according to the third exemplary embodiment can be applied to the imaging apparatus according to the second exemplary embodiment except for the portion corresponding to FIG. 10.

According to the first and second exemplary embodiments, only the 12-bit image input from the imaging optical system 101 is used in the saturation determination process. However, in practice, the 12-bit image to be converted into the 8-bit image may be saturated while performing the development processing. Therefore, it may be desirable to determine whether the output image is saturated every time each image processing included in the development processing is executed.

FIG. 12 is a block diagram illustrating a configuration of the image conversion-display function in the imaging apparatus according to the third exemplary embodiment of the present invention.

Referring to FIG. 12, the development processing unit 106 includes the noise reduction unit 107, the de-mosaic processing unit 108, the white balance unit 114, the gamma correction unit 115, a YUV conversion unit 116, and a gradation conversion unit 117. The development processing unit 106 performs image processing as development processing in an order of noise reduction, de-mosaic processing, white balance adjustment, gamma correction, and YUV conversion. The development processing unit 106 then performs gradation conversion and acquires the 8-bit image.

Saturation determination units 105a, 105b, 105c, 105d, 105e, and 105f are connected to output ends of the respective processing units including the imaging optical system 101 in the development processing unit 106. The saturation determination is thus performed on the output 12-bit image data respectively, and if saturation is determined, the notification unit 110 notifies the user thereof. In the example illustrated in FIG. 12, the saturation determination units 105a, 105b, 105c, 105d, 105e, and 105f perform the saturation determination. However, one saturation determination unit 105 may perform the saturation determination on each of the output 12-bit image data.

According to the third exemplary embodiment, the saturation determination is performed on the output image every time each image processing included in the development processing is performed. The accuracy of the saturation determination can thus be improved.

Figure 13:
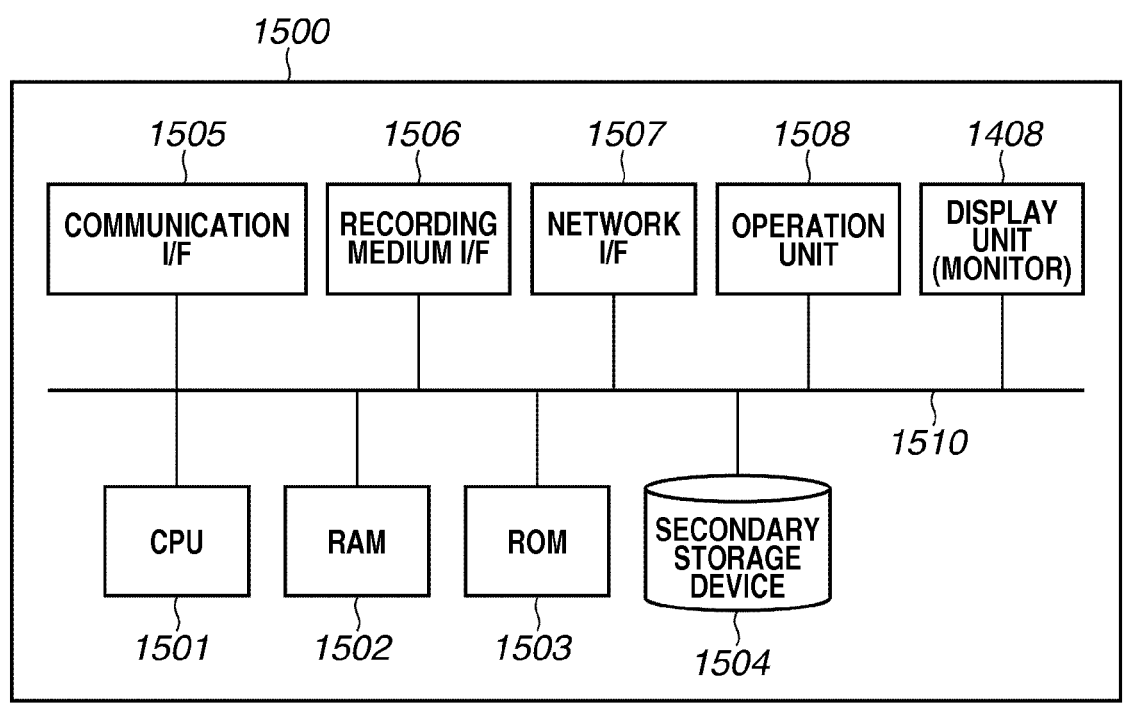
FIG. 13 is a block diagram illustrating an example of a configuration of an image display apparatus according to a fourth exemplary embodiment of the present invention.

FIG. 13 is a block diagram illustrating a schematic configuration of an image display apparatus according to a fourth exemplary embodiment of the present invention.

Referring to FIG. 13, an image display apparatus 1500 such as a PC includes a CPU 1501, a RAM 1502, and a ROM 1503 that stores basic control programs for the image display apparatus. When the image display apparatus 1500 is activated, the control programs are read into the RAM 1502 and executed by the CPU 1501.

A secondary recording device 1504 is a hard disk, which stores high-level control programs to be executed by the CPU 1501. The high-level control programs may be read into the RAM 1502 and are executed by the CPU 1501.

A communication I/F 1505 such as the USB port connects the image display apparatus 1500 with external devices and communicates therewith. A recording medium I/F 1506 is used to read from and write on a recording medium such as a memory card or a digital versatile disk (DVD)-RAM. A network cable is connected to a network I/F 1507.

An operation unit 1508 is used by the user to input information to the image display apparatus 1500 and includes a keyboard and a mouse. A display unit 1408, which displays images and a graphical user interface (GUI) screen, includes a monitor of the PC. A bus 1510 is used by the above-described components to exchange information between each other.

A function of the image display apparatus 1500 for reading a higher bit depth image file (e.g., 12 bit), converting the read file to a lower bit depth image (e.g., 8 bit), and displaying the converted image will be described below.

Figure 14:
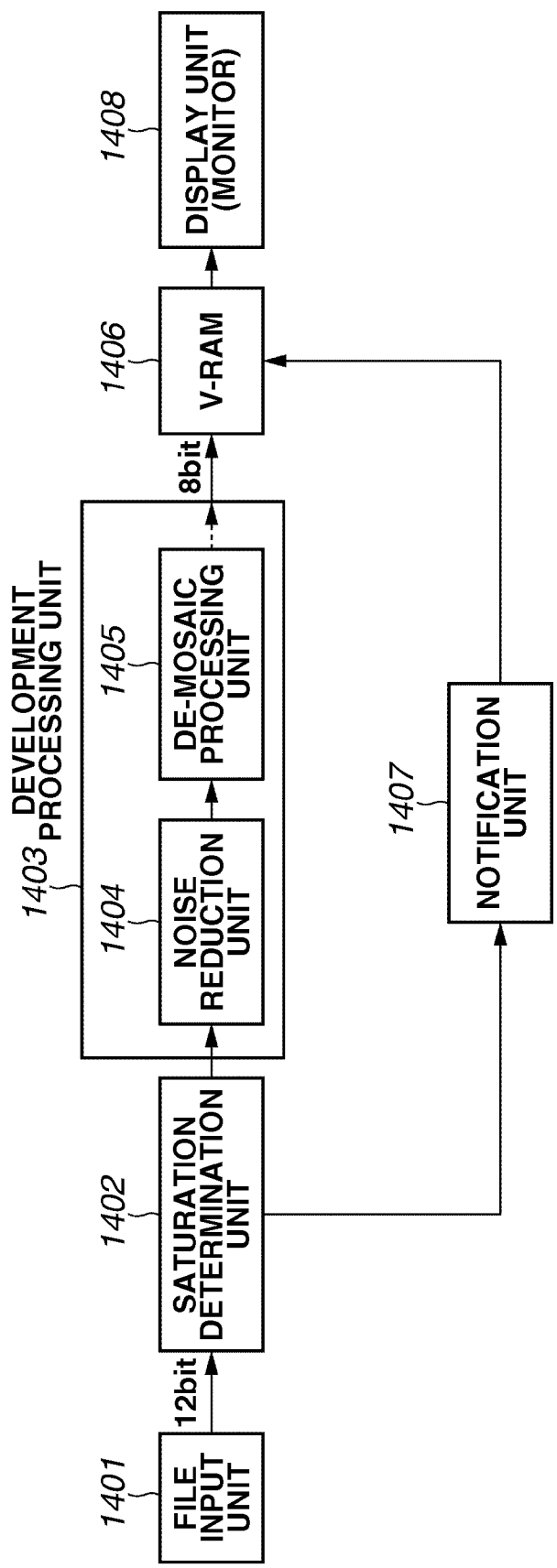
FIG. 14 is a block diagram illustrating an example of a configuration of an image conversion-display function in an image display apparatus according to the fourth exemplary embodiment of the present invention.

FIG. 14 is a block diagram illustrating a configuration of the image conversion-display function in the image display apparatus illustrated in FIG. 13.

Referring to FIG. 14, a file input unit 1401 reads a 12-bit depth image file from a recording medium, a device connected via the USB, or a network (not illustrated). A saturation determination unit 1402 configured of a CPU 1501 and a RAM 1502 determines whether there is a saturated pixel in the 12-bit image input from the file input unit 1401. More specifically, if a relation between luminance l of the 12-bit image and threshold values M and N (wherein M<N) is l<M or l>N, the pixel is determined to be saturated.

A development processing unit 1403 configured of the CPU 1501 and the RAM 1502 includes a plurality of image processing units such as a noise reduction unit 1404 and a de-mosaic processing unit 1405 (refer to FIG. 12). The development processing unit 1403 performs image processing on and converts (develops) the 12-bit image to the 8-bit image. A video (V)-RAM 1406 temporarily stores the developed 8-bit image data.

If the saturation determination unit 1402 determines that there is a saturated pixel in the 12-bit image, the saturation determination unit 1402 notifies the notification unit 1407 thereof. The notification unit 1407 is configured of the CPU 1501 and the RAM 1502. The notification unit 1407 then writes in the 8-bit image data recorded in the V-RAM 1406 information to inform the user that there is a saturated pixel in the 12-bit image. The content of the information will be described below. The image data recorded in the V-RAM 1406 is output on the display unit 1408.

Figure 15:
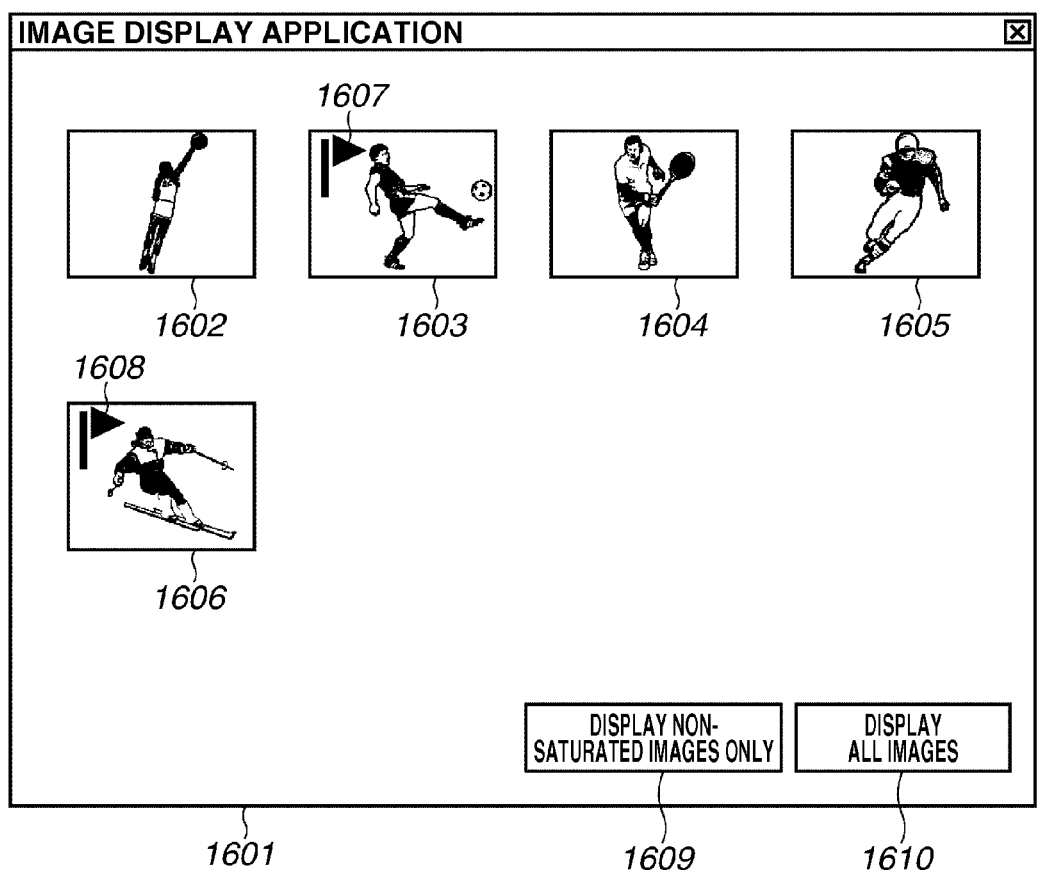
FIG. 15 illustrates an example of a screen displayed on a display unit of an image display apparatus according to the fourth exemplary embodiment of the present invention.
Figure 16:
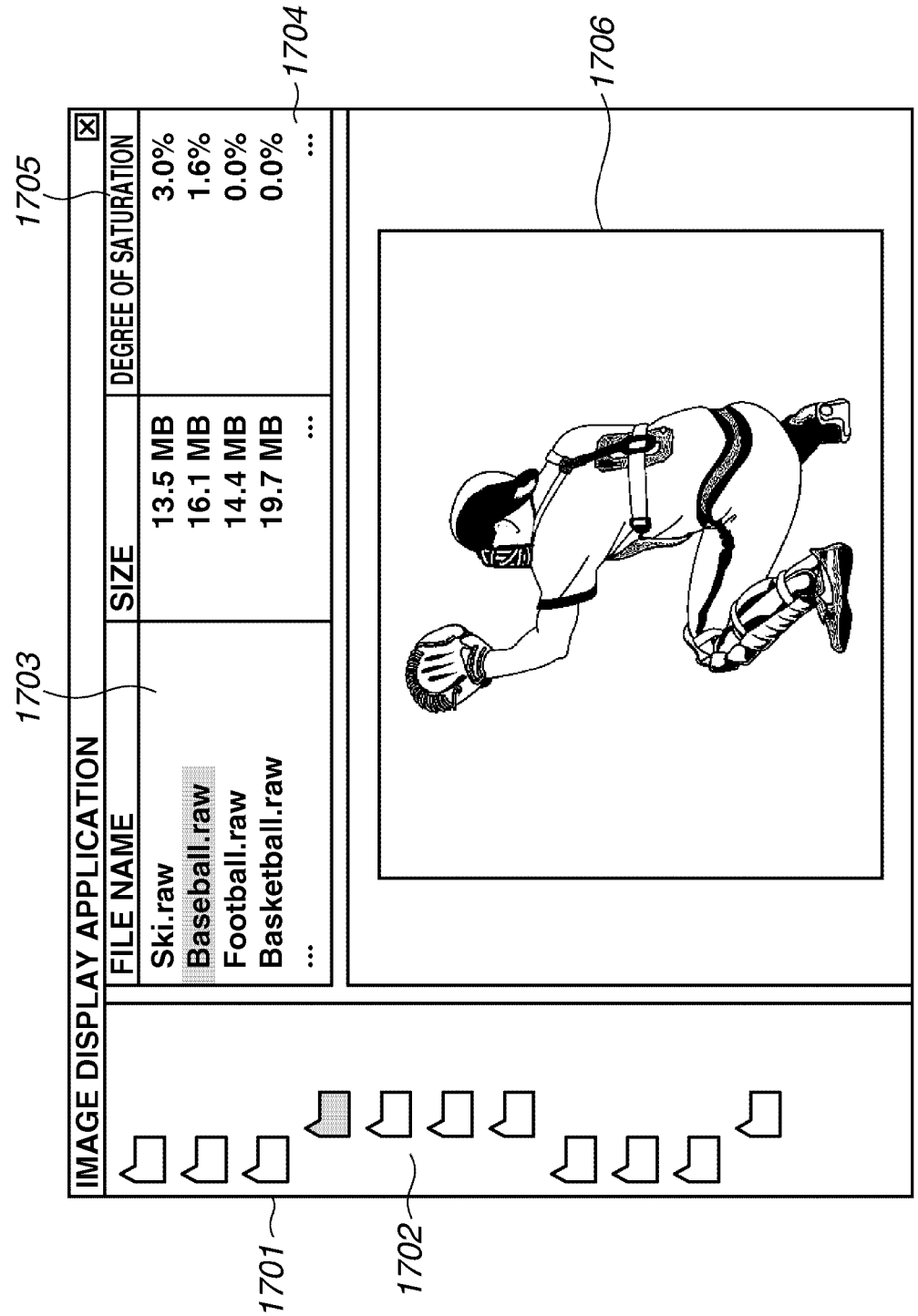
FIG. 16 illustrates an example of a screen displayed on a display unit of an image display apparatus according to the fourth exemplary embodiment of the present invention.

FIGS. 15 and 16 illustrate examples of screens displayed on the display unit 1408 in the image display apparatus 1500.

Referring to FIG. 15, a screen 1601 displays a list of a plurality of 8-bit images, i.e., thumbnail images 1602, 1603,

1604, 1605, and 1606. The thumbnail images 1603 and 1606 include icons 1607 and 1608, which indicate that the 12-bit images from which the thumbnail images are converted are saturated.

By displaying such icons, the image display apparatus 1500 can easily notify the user of the images in which saturation is generated among the 12-bit images input therein. The shapes and the positions of the icon are not limited to the example illustrated in FIG. 15, and it is not necessary to use the icons so long as it is distinguishable from the thumbnail image.

When the user presses a button 1609 in the screen 1601, the image display apparatus 1500 displays on the display unit 1408 only the thumbnail images, which have been converted from 12-bit images that are not saturated. As a result, images that are saturated before conversion and are not appropriate for viewing or processing can be filtered. If the user then presses a button 1610, the image display apparatus 1500 again displays all thumbnail images.

Referring to FIG. 16, a screen 1701 displays an image (i.e., an 8-bit display image) when the user designates an image file.

More specifically, the user designates a folder from a folder tree in a pane 1702 on the screen 1701. The image display apparatus 1500 then displays in a pane 1703 a list of names of the image files stored in the designated folder and properties of the images (e.g., size and degree of saturation). The image display apparatus 1500 displays the degree of saturation of each image in a column 1704. The degree of saturation is a percentage of the saturated pixels with respect to all pixels in the 12-bit image before conversion.

If the user clicks on a bar 1705, the image files can be sorted in an order of high saturation or low saturation. If the user then designates a file in the pane 1703, the image display apparatus 1500 displays the 8-bit output image in a display area 1706.

When the images are displayed in the screens 1601 and 1701, the portion in the displayed image (i.e., portion 805 illustrated in FIG. 8) corresponding to the saturated portion in the 12-bit image (i.e., portion 803 illustrated in FIG. 8) is colored (e.g. red). As a result, the user can easily recognize the saturated portion in the input image.

An operation performed when an image file is input in the image display apparatus 1500 will be described below with reference to flowcharts illustrated in FIGS. 17 and 18.

Figure 17:
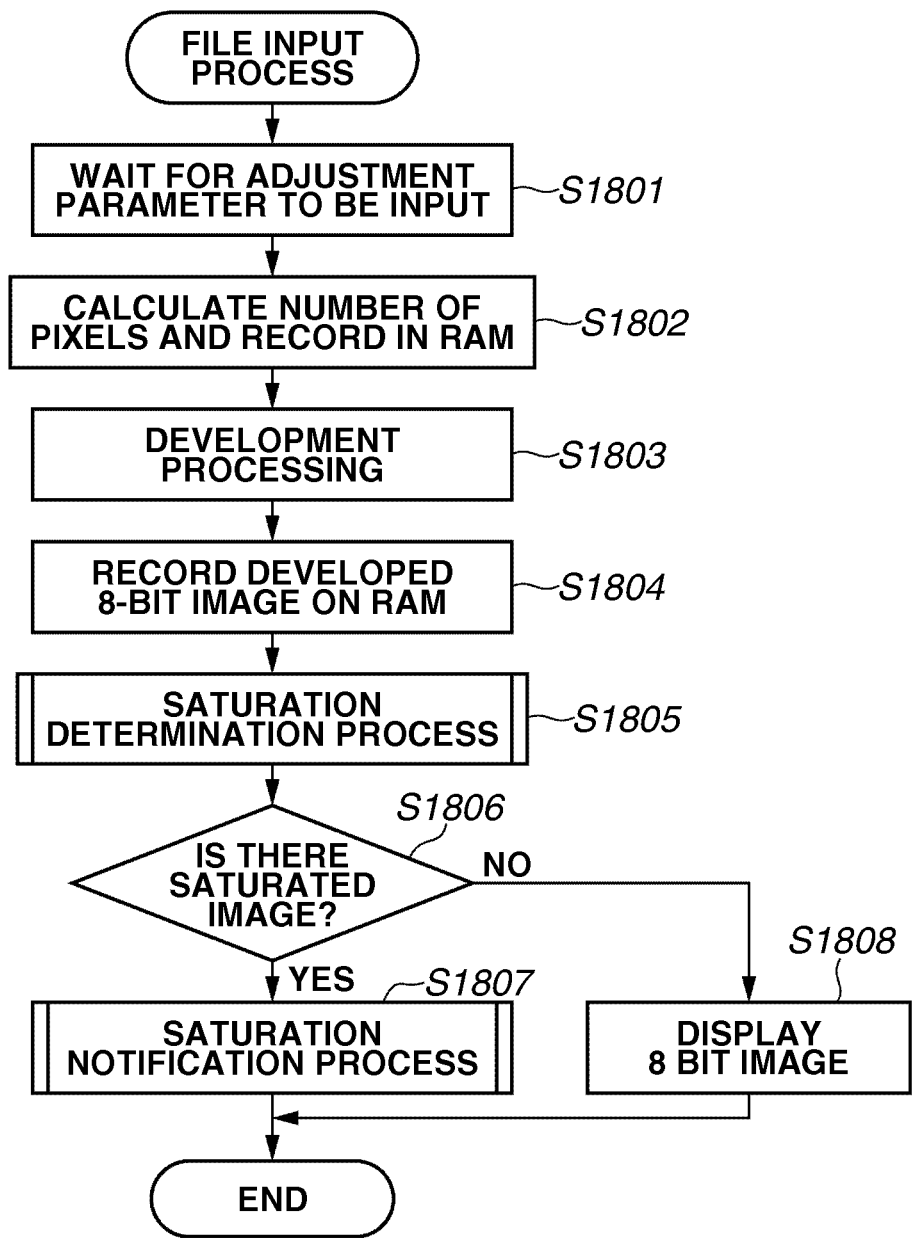
FIG. 17 is a flowchart illustrating a file input process performed in an image display apparatus according to the fourth exemplary embodiment of the present invention.

FIG. 17 is a flowchart illustrating a file input process performed by the image display apparatus 1500. The CPU 1501 mainly performs control in the process, and the process is performed by the CPU 1501 executing the control program read out from the secondary storage device 1504 onto the RAM 1502.

In step S1801, after the image file is input, the CPU 1501 waits for the user to input the adjustment parameters (e.g., exposure, color temperature, and white balance). If default parameter values or parameter values previously input by the user are to be used as the adjustment parameters, the present step can be skipped.

In step S1802, the CPU 1501 calculates the number of pixels from the width and the height of image in the input image file and records the result on the RAM 1502. In step S1803, the CPU 1501 performs development processing on the image file. Since the development processing is performed using a known method, description will be omitted.

In step S1804, the CPU 1501 records the 8-bit image acquired by performing the development processing in the V-RAM 1406. In step S1805, the CPU 1501 performs the saturation determination process, and the process then proceeds to step S1806. Since the saturation determination process is the same as in FIG. 6, description will be omitted.

In step S1806, the CPU 1501 determines whether saturation is generated in the input image. If saturation is generated (YES in step S1806), the process proceeds to step S1807. In step S1807, the CPU 1501 performs the saturation notification process to notify the user on the saturation, and the process then ends. The saturation notification process will be described in detail below with reference to FIG. 18.

On the other hand, if saturation is not generated in the image (NO in step S1806), the process proceeds to step S1808. In step S1808, the CPU 1501 displays the developed 8-bit display image on the display unit 1408. The process then ends.

Figure 18:
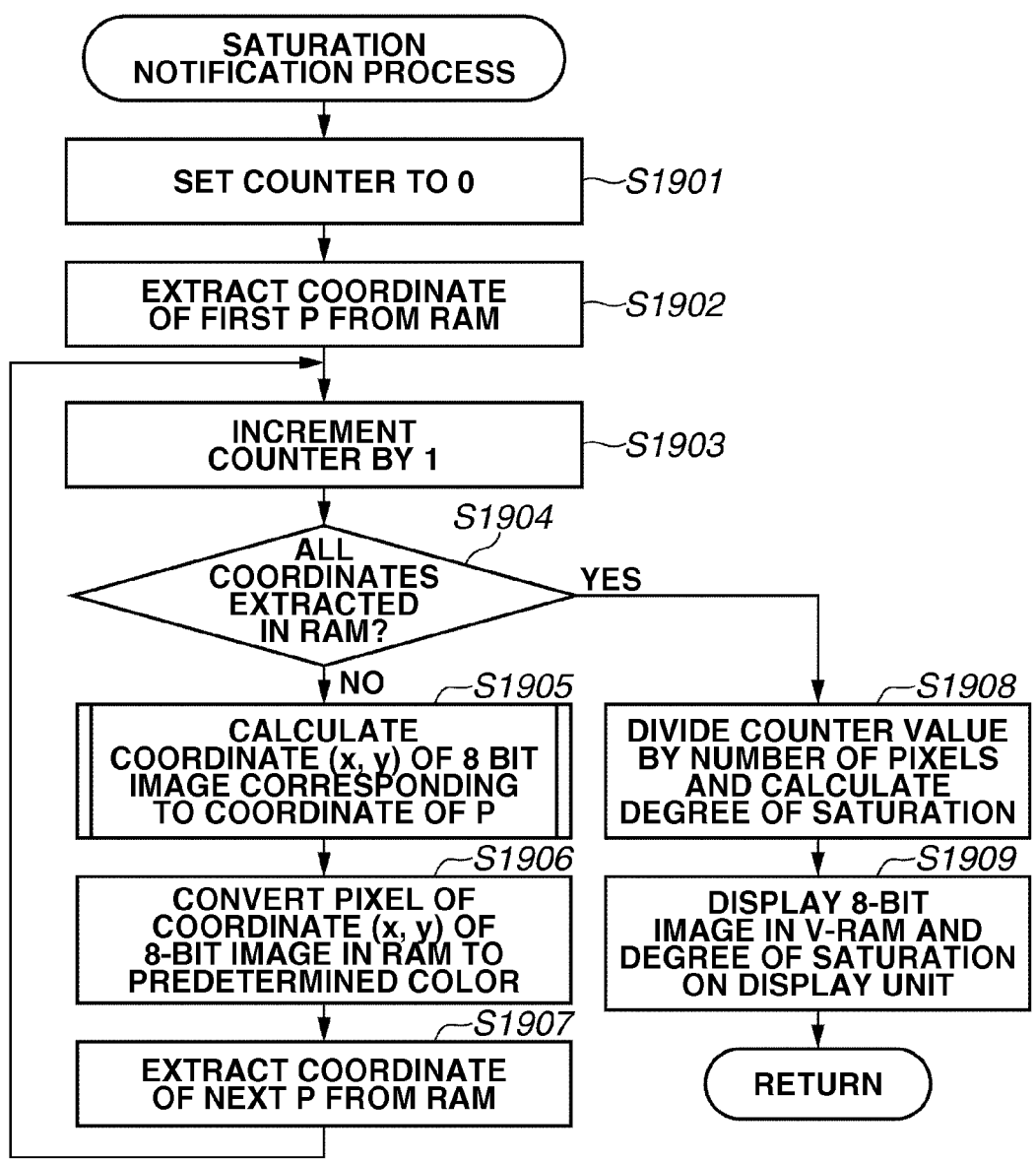
FIG. 18 is a flowchart illustrating a saturation notification process performed in an image display apparatus according to the fourth exemplary embodiment of the present invention.

FIG. 18 is a flowchart illustrating in detail the saturation notification process performed in step S1807 illustrated in FIG. 17. The process is executed by the development processing unit 1403 and the notification unit 1407 illustrated in FIG. 14. However, the CPU 1501 actually performs the process.

In step S1901, the notification unit 1407 sets a value of a counter to 0. In step S1902, the notification unit 1407 extracts a first coordinate P from the coordinates of the pixels recorded on the RAM 1502 when the CPU 1501 has performed the saturation determination process in step S1805. In step S1903, the notification unit 1407 increments the counter by 1. In step S1904, the notification unit 1407 determines whether all coordinates in the RAM 1502 have been extracted.

If there are coordinates that have not been extracted (NO in step S1904), the process proceeds to step S1905. In step S1905, the notification unit 1407 acquires the coordinate on the 8-bit image of the pixel at a position corresponding to the coordinate (x, y) of P. Since the coordinate is acquired using the same method as in the first exemplary embodiment, description will be omitted.

In step S1906, the notification unit 1407 converts the color of the pixel of the coordinate (x, y) on the 8-bit image in the V-Ram 1406 to a preset color (e.g., red). In step S1907, the notification unit 1407 extracts the next coordinate P from the RAM 1502. The process then returns to step S1903.

If the notification unit 1407 determines that all coordinates in the RAM 1502 have been extracted (YES in step S1904), the process proceeds to step S1908. In step S1908, the notification unit 1407 divides the counter value by the number of pixels calculated in step S1802 and thus calculates a percentage of the saturated pixels with respect to all pixels in the input image (i.e., the degree of saturation). In step S1909, the notification unit 1407 displays on the display unit 1408 the 8-bit image in the V-RAM 1406 and the degree of saturation acquired in step S1908.

According to the fourth exemplary embodiment, the user of the image display apparatus 1500 can easily recognize whether the 12-bit image before conversion is saturated, and which portion is saturated if the image is saturated. As a result, the user can easily identify the saturated image and is not appropriate for viewing or processing. Further, if the image is to be viewed or processed, the effect of the saturation can be reduced to a minimum by changing digital exposure and brightness.

The fourth exemplary embodiment describes a case where the present invention is applied to the image display apparatus. However, the present invention is also effective if applied to an imaging apparatus such as the digital camera.

The above-described exemplary embodiments are directed to a case where the bit depth of the input image is 12 bit. However, the present invention is not limited to the above. For example, there can be a determination unit for determining the bit depth of the input image. The saturation determination process and the notification process are then performed for bit depths that exceed preset threshold values. Further, the bit depth can be described in the header of the input image, so that the bit depth of the input image can be determined based on the information. Furthermore, the user can set the bit depth of the input image.

The first, second, and third exemplary embodiments described a case where the present invention is applied to an imaging apparatus. However, the present invention is not limited to the above, and can be applied to an image display apparatus such as the PC. Further, the same effect as the present invention can be achieved by combining the above-described exemplary embodiments.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-094028 filed Apr. 8, 2009, which is hereby incorporated by reference herein in its entirety.

What is claimed is:

1. An apparatus comprising:
   an acquisition unit configured to acquire an input image;
   a conversion unit configured to convert the acquired input image to an output image of lower bit depth;
   a detection unit configured to detect in the input image a pixel having a predetermined luminance;
   a comparison unit configured to compare a gradation of the input image with a gradation of the output image;
   a calculation unit configured to calculate a position of the output image corresponding to a position of the detected pixel in the input image, if the gradation of the input image is greater than the gradation of the output image; and
   a display unit configured to display the output image on a screen so that the calculated position is identifiable,
   wherein the detection unit further detects a pixel having a predetermined luminance in the output image, and
   wherein the display unit further displays a position of the pixel having the predetermined luminance in the output image to be identifiable from the calculated position.

2. The apparatus according to claim 1,
   wherein the detection unit detects the pixel satisfying a condition of either luminance is greater than a first threshold value or smaller than a second threshold value that is smaller than a first threshold value, and
   wherein the display unit displays the output image on the screen to be distinguishable that the pixel corresponding to the calculated position is detected based on which condition.

3. The apparatus according to claim 1, further comprising a degree of saturation calculation unit configured to calculate a percentage of the detected pixels with respect to all pixels in the input image,
   wherein the display unit further displays on a screen information about the input image in an order of the calculated percentage.

4. The apparatus according to claim 1,
   wherein the conversion unit converts the input image to the output image by performing a plurality of image processing on the input image, and
   wherein the detection unit detects in the input image the pixel having the predetermined luminance every time one of the image processing is performed on the input image.

5. The apparatus according to claim 1, further comprising a comparison unit configured to compare a bit depth of the input image with a predetermined threshold value,
   wherein the detection unit detects in the input image the pixel having the predetermined luminance when the bit depth of the input image is greater than the predetermined threshold value.

6. An apparatus comprising:
   an acquisition unit configured to acquire a raw image;
   a conversion unit configured to convert the acquired raw image to a display image;
   a detection unit configured to detect in the raw image a pixel having a predetermined luminance;
   a comparison unit configured to compare a gradation of the input image with a gradation of the output image;
   a calculation unit configured to calculate a position of the display image corresponding to a position of the detected pixel in the raw image, if the gradation of the input image is greater than the gradation of the output image; and
   a display unit configured to display the display image on a screen so that the calculated position is identifiable,
   wherein the detection unit further detects a pixel having a predetermined luminance in the display image, and
   wherein the display unit further displays a position of the pixel having the predetermined luminance in the display image to be identifiable from the calculated position.

7. A method for displaying an image comprising:
   acquiring an input image;
   converting the acquired input image to an output image of lower bit depth;
   detecting in the input image a pixel having a predetermined luminance;
   comparing a gradation of the input image with a gradation of the output image;
   calculating a position in the output image corresponding to a position of the detected pixel in the input image, if the gradation of the input image is greater than the gradation of the output image; and
   displaying the output image on a screen so that the calculated position is identifiable,
   wherein the detecting further detects a pixel having a predetermined luminance in the output image, and
   wherein the displaying further displays a position of the pixel having the predetermined luminance in the output image to be identifiable from the calculated position.

8. The method according to claim 7, wherein
   the detecting the pixel satisfies a condition of either luminance is greater than a first threshold value or smaller than a second threshold value that is smaller than a first threshold value; and the displaying the output image on the screen to be distinguishable that the pixel corresponding to the calculated position is detected based on which condition.

9. The method according to claim 7, further comprising calculating a percentage of the detected pixels with respect to all pixels in the input image; and displaying on a screen information about the input image in an order of the calculated percentage.

10. The method according to claim 7, wherein the converting the input image to the output image includes performing a plurality of image processing on the input image, and wherein the detecting in the input image the pixel having the predetermined luminance every time one of the image processing is performed on the input image.

11. The method according to claim 7, further comprising comparing a bit depth of the input image with a predetermined threshold value, wherein the detecting detects in the input image the pixel having the predetermined luminance when the bit depth of the input image is greater than the predetermined threshold value.

12. A non-transitory computer-readable recording medium storing a computer-executable-program for causing a computer to execute a method, the method comprising:

acquiring an input image;

converting the acquired input image to an output image of lower bit depth;

detecting in the input image a pixel having a predetermined luminance;

comparing a gradation of the input image with a gradation of the output image;

calculating a position of the output image corresponding to a position of the detected pixel in the input image, if the gradation of the input image is greater than the gradation of the output image; and displaying the output image on a screen so that the calculated position is identifiable, wherein the detecting further detects a pixel having a predetermined luminance in the output image, and wherein the displaying further displays a position of the pixel having the predetermined luminance in the output image to be identifiable from the calculated position.

13. The non-transitory computer-readable recording medium according to claim 12, wherein the detecting the pixel satisfies a condition of either luminance is greater than a first threshold value or smaller than a second threshold value that is smaller than a first threshold value; and the displaying the output image on the screen to be distinguishable that the pixel corresponding to the calculated position is detected based on which condition.

14. The non-transitory computer-readable recording medium according to claim 12, further comprising comparing a bit depth of the input image with a predetermined threshold value, wherein the detecting detects in the input image the pixel having the predetermined luminance when the bit depth of the input image is greater than the predetermined threshold value.

\* \* \* \* \*